(12) United States Patent
Keon, Jr.

(10) Patent No.: US 6,260,530 B1
(45) Date of Patent: Jul. 17, 2001

(54) VORTEX-INDUCING VALVE SEAT INSERT

(76) Inventor: Joseph J. Keon, Jr., 130 S. June St., Los Angeles, CA (US) 90004

( * ) Notice: Subject to any disclaimer, the term of this patent is extended or adjusted under 35 U.S.C. 154(b) by 0 days.

(21) Appl. No.: 09/442,374

(22) Filed: Nov. 17, 1999

(51) Int. Cl.[7] .................................................. F02N 3/00
(52) U.S. Cl. ............................................................ 123/188.8
(58) Field of Search .............................. 123/188.3, 188.8, 123/188.11, 306, 188.7, 251, 262; 29/888.44; 251/126

(56) References Cited

U.S. PATENT DOCUMENTS

| | | | |
|---|---|---|---|
| 1,512,952 | * 10/1924 | Secor | 123/590 |
| 1,555,991 | * 10/1925 | Konar | 123/308 |
| 3,653,368 | * 4/1972 | Scherenberg | 123/188.8 |
| 4,151,816 | * 5/1979 | Schroder | 123/308 |
| 4,355,604 | * 10/1982 | Chaibongsai | 123/188.7 |
| 4,424,777 | * 1/1984 | Klomp | 123/188.7 |
| 4,756,281 | * 7/1988 | Chen et al. | 123/90.6 |

* cited by examiner

Primary Examiner—Noah P. Kamen
Assistant Examiner—Hai Huynh
(74) Attorney, Agent, or Firm—Edwin A. Suominen; Louis J. Hoffman

(57) ABSTRACT

A valve seat insert includes a ring bounded by surfaces including an inner wall circumferentially disposed about an imaginary central axis passing through the insert. The inner wall includes a plurality of grooves oriented diagonally with respect to the central axis. This and other disclosed valve seat designs impart a vortex to an air-fuel mixture as it enters the combustion chamber, improving combustion efficiency.

22 Claims, 6 Drawing Sheets

VORTEX-INDUCING VALVE SEAT INSERT

BACKGROUND OF THE INVENTION

A significant factor in the efficiency of an internal combustion engine is the degree to which fuel droplets are atomized and vaporized. Ideally, the combustion chamber should contain an air-fuel mixture that is in a completely gaseous state before ignition.

Imparting a vortex to the air-fuel mixture as it enters the combustion chamber improves combustion efficiency. Liquid fuel particles that are swirling in a vortex disburse more readily and evenly than particles that are simply drawn into the combustion chamber without a vortex.

The benefits of imparting a vortex to an air-fuel mixture on its way to a combustion chamber are known. Conventional structure for imparting such a vortex includes valve having helical grooves, valves and valve seat insert having vaned surfaces, and rifled intake ports and manifolds. An example of a valve having helical grooves is disclosed in U.S. Pat. No. 5,771,852 to Heimann, Jr., et al. Examples of conventional valves and valve seat inserts that use vaned surfaces to impart a vortex are found in U.S. Pat. No. 4,744,340 to Kirby for a "vortex generator intake valve," and U.S. Pat. No. 4,389,988 to Ong for a "swirl generating device," which is installed at the opening of a combustion chamber's intake port. U.S. Pat. No. 5,632,145 to Hunt discloses an example of a rifled intake manifold.

Grooves on a valve can impart a vortex to an air-fuel mixture, but a grooved valve presents certain disadvantages. First, a valve is a structural member, and its strength is compromised by removing structural material from its surface to create grooves. Second, only the neck of the valve has enough surface area in contact with the incoming air-fuel mixture to interact significantly with the mixture, and the neck of the valve slows down the air-fuel mixture by the time the mixture approaches it. Consequently, grooves on the neck of the valve cannot interact with the air-fuel mixture as efficiently as grooves in other parts of an engine.

Vaned surfaces present at least two significant problems when placed in the path of an air-fuel mixture in an internal combustion engine. First, vanes used to impart a vortex to the mixture also reduce its intake velocity, which is undesired. Reducing intake velocity of the air-fuel mixture reduces the maximum horsepower of the engine. Second, vanes such as those disclosed in the '988 patent have the potential to break off during operation of the engine. Vane fragments can cause seizure of a piston and destruction of the engine.

Rifling the walls of an intake port or manifold avoids the problems of vaned surfaces. To modify an existing engine to a vortex-inducing configuration, however, a significant portion of the engine must be replaced. For example, an existing engine manifold may be replaced with a rifled manifold such as that disclosed in the '145 patent.

Accordingly, the need remains for an engine component that can be retrofitted into an existing engine in a region where an air-fuel mixture enters the engine's combustion chamber at relatively high velocity. The need further remains for such a component that can be installed as an alternative or in addition to a grooved valve, without the need for replacement of a significant portion of the engine.

SUMMARY OF THE INVENTION

A valve seat insert according to various aspects of the present invention includes a ring that is bounded by surfaces including an inner wall. The inner wall is circumferentially disposed about an imaginary central axis, which passes through the insert. The inner wall includes a plurality of grooves. Each groove is oriented diagonally with respect to the central axis.

In an operating engine, the valve seat insert cooperates with a valve, which regulates the flow of an air-fuel mixture into the engine's combustion chamber. The air-fuel mixture comes into contact with the grooves of the insert before coming into contact with the valve. Advantageously, the grooves interact with the air-fuel mixture in a region of high velocity, before it is slowed by the valve. employing grooves rather than vanes to impart a vortex, a valve seat insert according to various aspects of the invention improves combustion efficiency while keeping its inner wall (the inlet to the combustion chamber) free of obstructions. Consequently, the insert promotes disbursement of liquid fuel particles without restricting flow of the particles into the combustion chamber. In addition, by omitting vanes, the insert avoids the possibility of vanes breaking off during operation of the engine and causing damage.

A valve seat insert according to one aspect of the invention is fabricated from an alloy including chrome, carbon, and iron. Such an insert is able to tolerate the high level of heat generated during operation of the engine and to conduct heat into surrounding structure of the engine. According to further aspects of the invention, the insert can be fabricated from particularly advantageous alloys. These alloys variously have beneficial properties including heat tolerance and thermal conductivity. One of those alloys achieves these beneficial properties at reduced cost by including tungsten.

According to further aspects of the invention, the grooves of the valve seat insert can have particularly advantageous shapes and arrangements along the inner wall of the insert. For example, the grooves can be oriented at an angle about 70–80 degrees from a plane parallel to the central axis of the insert. In addition, the grooves can have a variable depth, the greatest depth being at the midpoint of the grooves. The grooves can also taper to the inside wall of the insert, rather than beginning and ending abruptly.

An engine can be modified to employ grooved valve seat inserts, according to various aspects of the present invention, to provide improved combustion efficiency without the need for replacement of significant parts of the engine. Replacement of a conventional valve seat insert is less expensive than replacement of an entire intake manifold. Modification can include replacement of conventional valve seat inserts with grooved inserts as an alternative to the replacement of plain valves with grooved valves. Such modification improves engine efficiency without the need for grooved valves, which may have reduced structural integrity. Alternatively, an engine can be modified to use, in combination, grooved valve seat inserts of the invention and conventional grooved valves.

DESCRIPTION OF THE DRAWING

Various embodiments of the present invention are described below with reference to the drawing, wherein like designations denote like elements.

DESCRIPTION OF PREFERRED EXEMPLARY EMBODIMENTS

Figure 1:
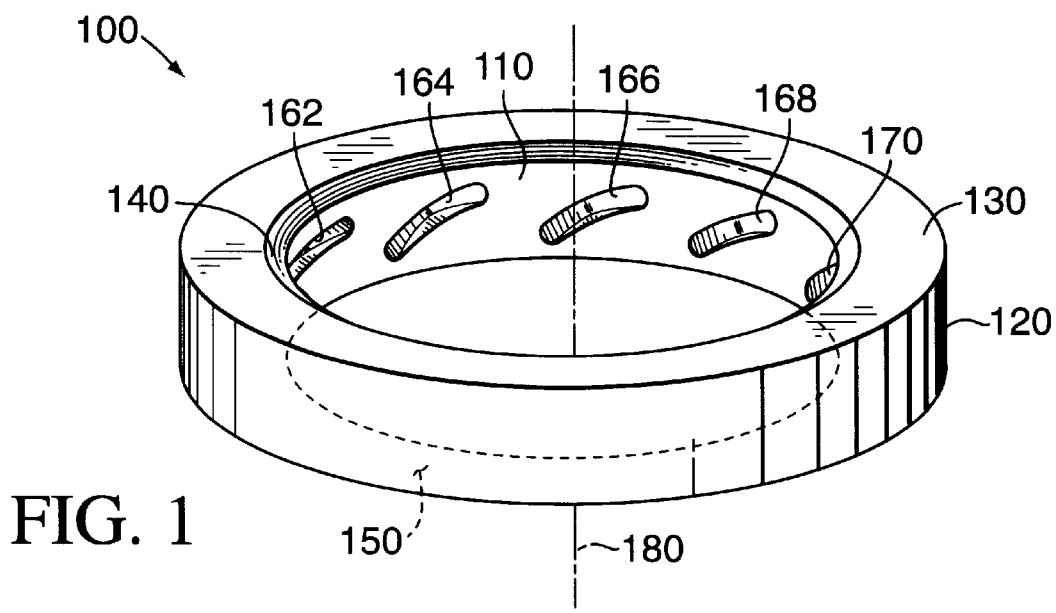
FIG. 1 is a perspective view of a valve seat insert according to various aspects of the present invention.

A valve seat insert according to various aspects of the present invention imparts a vortex to an air-fuel mixture as it enters the combustion chamber of an internal combustion engine. An example of such a valve seat insert may be better understood with reference to FIGS. 1–3. Valve seat insert 100 is formed as a ring of heat-tolerant material, which is circumferentially disposed about an axis 180. The ring of insert 100 is bounded by surfaces including: an inner wall 110, an outer wall 120, a top surface 130, an angled seating portion 140, and a bottom surface 150. Top surface 130 and angled seating portion 140 are disposed between inner wall 110 and outer wall 120 on the upper portion of insert 100. Bottom surface 150 is disposed between inner wall 110 and outer wall 120 on the lower portion of insert 100.

The inner wall of a valve seat insert according to various aspects of the invention includes a plurality of grooves. For example, inner wall 110 of valve seat insert 100 includes grooves 162, 164, 166, 168, 170, all shown in FIG. 1, and others obscured by outer wall 120 in the view of FIG. 1. In an operating engine, grooves 162–170 of valve seat insert 100 impart a vortex to the air-fuel mixture as it enters the combustion chamber of the engine. Advantageously, the grooves interact with the air-fuel mixture in a region of high velocity, before a valve (not shown in FIG. 1) slows the air-fuel mixture. Exemplary structure of grooves 162–170 is discussed in greater detail below with reference to FIGS. 2 and 3. Certain purposes furthered by grooves 162–170 are further discussed below with reference to FIGS. 4 and 5.

An inner wall of a valve seat insert according to various aspects of the invention is any surface bounding the innermost portion of the ring of the valve seat insert. An inner wall can have any suitable dimensions and orientation. For example, the inner wall of a valve seat insert can be vertical, in which case the surface of the inner wall forms an open-ended cylinder parallel to the central axis of the insert. A vertical inner wall can be geometrically described as a cylinder with a diameter significantly greater than its height. Inner wall 110 is a vertical inner wall formed continuously parallel to central axis 180 of insert 100.

Top surface 130 and bottom surface 150 are continuously orthogonal to inner wall 110. However, the top and bottom surfaces of a valve seat insert according to the invention need not be continuously orthogonal to its inner wall. For example, the top surface and/or bottom surface of a valve seat insert can be tilted, e.g., to fit with other elements of an engine. Only one, or neither, of the top and bottom surfaces of such a valve seat insert can be continuously orthogonal to its inner wall, even when the inner wall is vertical.

Figure 11:
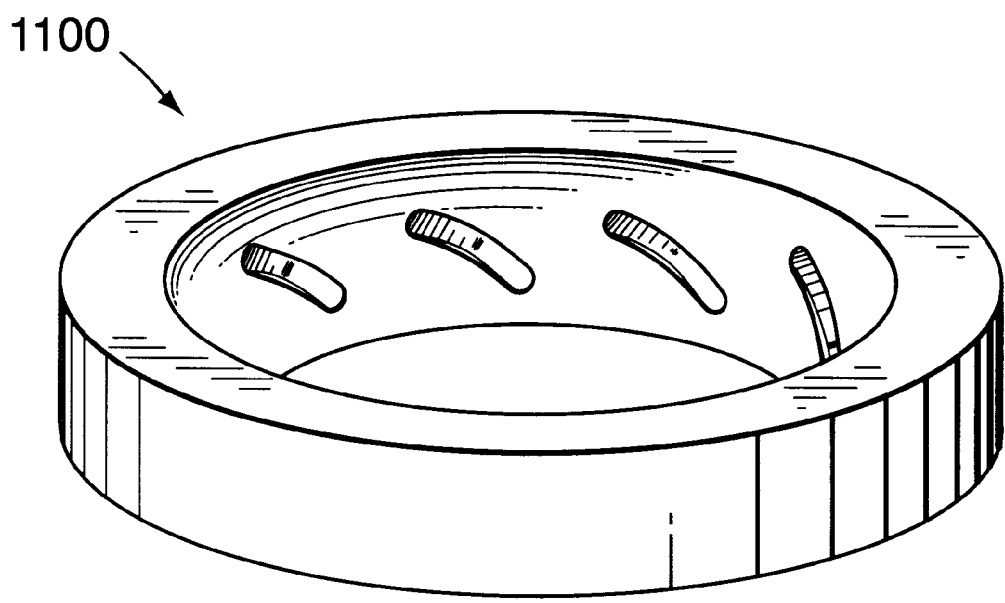
FIG. 11 is a perspective view of a valve seat insert according to various aspects of the present invention having an angled inner wall.
Figure 12:
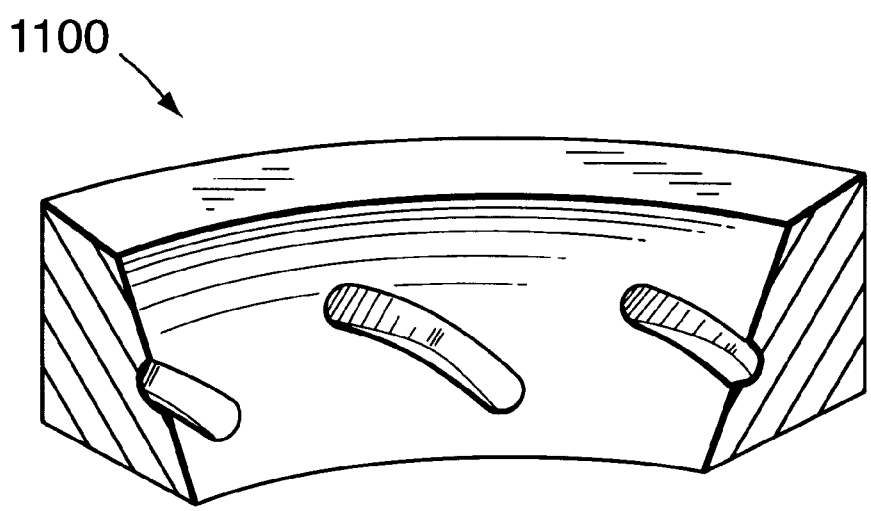
FIG. 12 is a perspective view of a portion of the valve seat insert of FIG. 11.
Figure 13:
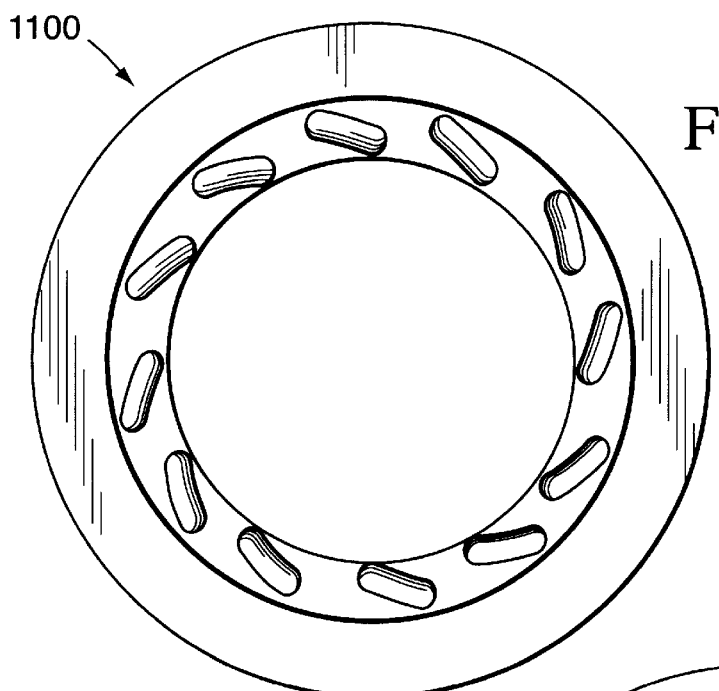
FIGS. 13, 14, and 15 are top, bottom, and side views, respectively, of the valve seat insert of FIG. 11.
Figure 14:
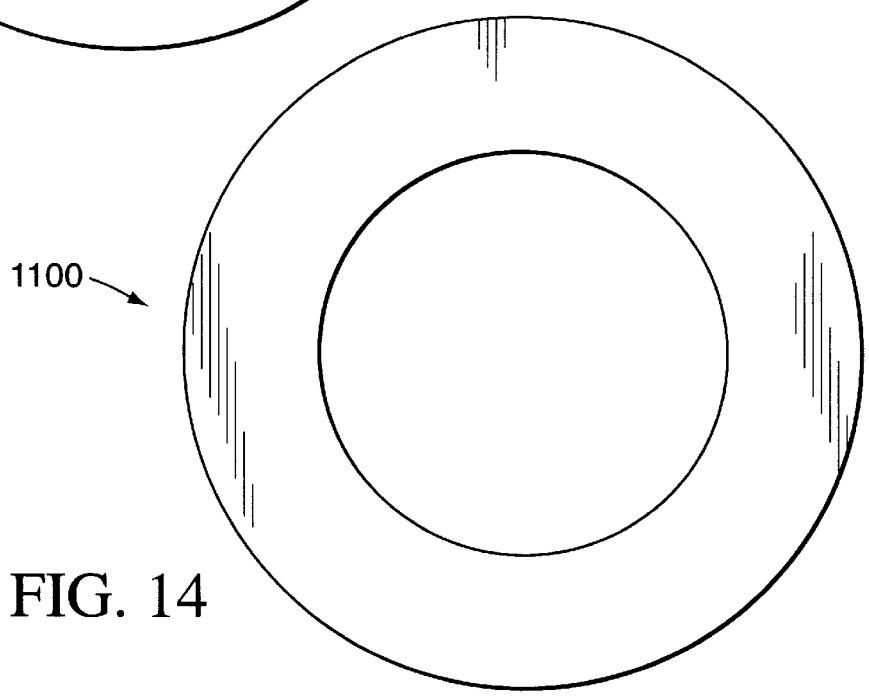
Figure 15:
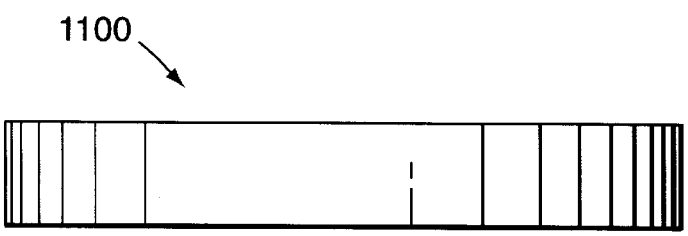

Alternatively, the inner wall can be angled such that its surface tilts outward. In valve seat insert 1100 of FIGS. 11, the upper portion of an angled inner wall is farther than the lower portion of the inner wall from the central axis of the valve seat insert. Such an angled inner wall may be geometrically described as a portion of an imaginary cone with a vertex some distance below the bottom surface of the valve seat insert. For example, the surface of an angled inner wall can be oriented 30 degrees from vertical, as illustrated in FIG. 12. As discussed below with reference to FIG. 5, angled seating portion 140 contacts the neck of a valve 420, which cooperates with valve seat insert 100 in an operating engine. An angled seating portion of a valve seat insert according to various aspects of the present invention is preferably oriented parallel to the neck of a cooperating valve. Angled seating portion 140 makes a direct transition from the inner wall to the top surface of the valve seat insert. To achieve a more gradual transition between the top surface and the inner wall, the angled seating portion of the insert can be bent (i.e., containing a number of planar surfaces) or curved. In one possible variation of a valve seat insert according to the invention, for example, the angled seating portion can include two planar sections, disposed coaxially about the central axis of the insert. In such a variation, the top surface of the insert can be flat (i.e., orthogonal to the central axis), the inner wall can be oriented 60 degrees from the top surface, or 30 degrees from the central axis. The outer section of the angled seating portion can be oriented 15 degrees from the top surface, and the inner section can be oriented 30 degrees from the top surface.

The inner wall grooves, according to various aspects of the invention, can have any suitable dimensions, shape, and orientation to impart a vortex to an air-fuel mixture. The grooves can have identical dimensions, shapes, and orientations, as in the example of grooves 162–170, illustrated in FIG. 1. Preferably, the grooves are oriented diagonally and substantially parallel to each other. The term "diagonal," with respect to inner wall grooves of a valve seat insert, describes grooves that do not lie in a plane passing through the central axis of the insert. In other words, diagonal grooves are neither substantially parallel nor substantially perpendicular to the central axis.

Figure 2:
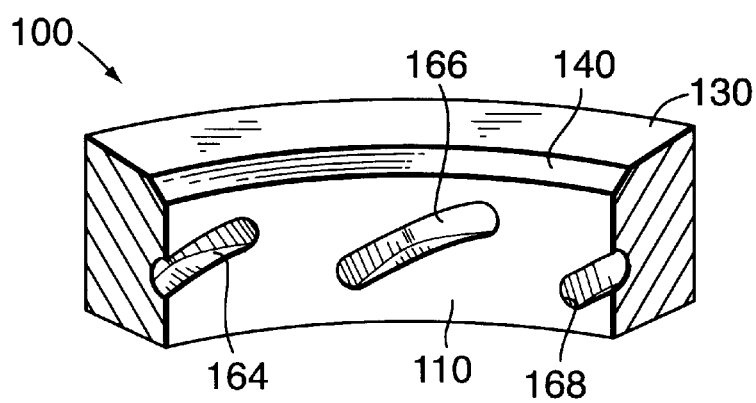
FIG. 2 is a perspective view of a portion of the valve seat insert of FIG. 1.
Figure 3:
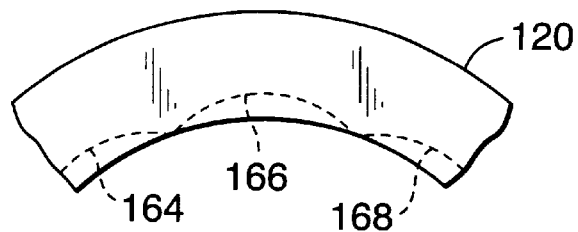
FIG. 3 is a top view of a portion of the valve seat insert of FIG. 1.

A valve seat insert according to various aspects of the invention can have grooves arranged in any desired grouping or spacing along its inner wall. For example, grooves 162–170 are spaced substantially equidistant from each other along inner wall 110 of valve seat insert 100. Alternatively, grooves can be spaced closer together at particular portions of an inner wall, for example in a region where an air-fuel mixture of particularly high velocity flow is expected. Grooves may occupy the entire height of the inner wall, or only a portion of the height. For example, grooves in an angled inner wall may occupy only the lower two-thirds of the inner wall, i.e., the portion of the imaginary cone closest to the vertex. Keeping the grooves away from the upper third of the inner wall allows a customized angled seating portion to be formed (e.g., by an engine retrofitter) from that portion of the valve seat without interference to the grooves. The structure of grooves 162–170 may be better understood with reference to FIGS. 2 and 3, which illustrate details of an exemplary groove 166 and portions of adjacent grooves 164 and 168. FIGS. 2 and 3 are a perspective view and top view, respectively, of valve seat insert 100.

As illustrated in FIG. 2, groove 166 is diagonally oriented, at an angle of about 70–80 degrees from a plane parallel to central axis 180, or about 10–20 degrees from a plane perpendicular to central axis 180. Top surface 130 and bottom surface 150 are both flat (i.e., lying in planes orthogonal to central axis 180). Consequently, groove 166 is also oriented at an angle about 10–20 degrees from both top surface 130 and bottom surface 150.

Inner wall grooves can have a variable depth. As may be better understood with reference to FIG. 3, for example, groove 166 tapers into inner wall 110 at each of its opposite ends to a maximum depth at its midpoint. At its point of maximum depth, a groove can extend into the inner wall by a significant fraction of the thickness of the valve seat insert, although any suitable maximum depth can be selected. For example, groove 166 has a maximum depth of about one-third the thickness of insert 100. (The thickness of insert 100 is the distance between inner wall 110 and outer wall 120.).

Figure 4:
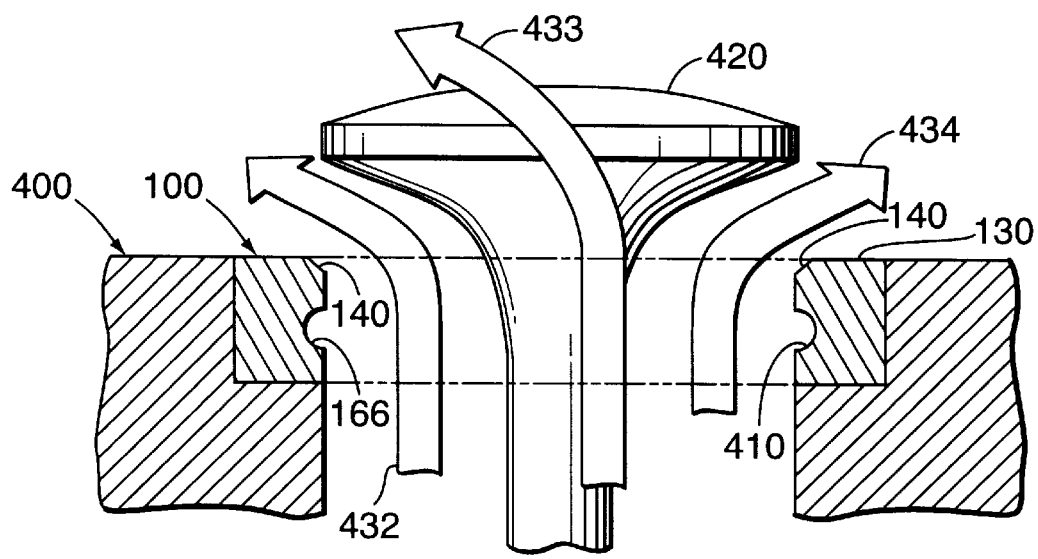
FIG. 4 is a cross-sectional view of the valve seat insert of FIG. 1 in an operating engine.
Figure 5:
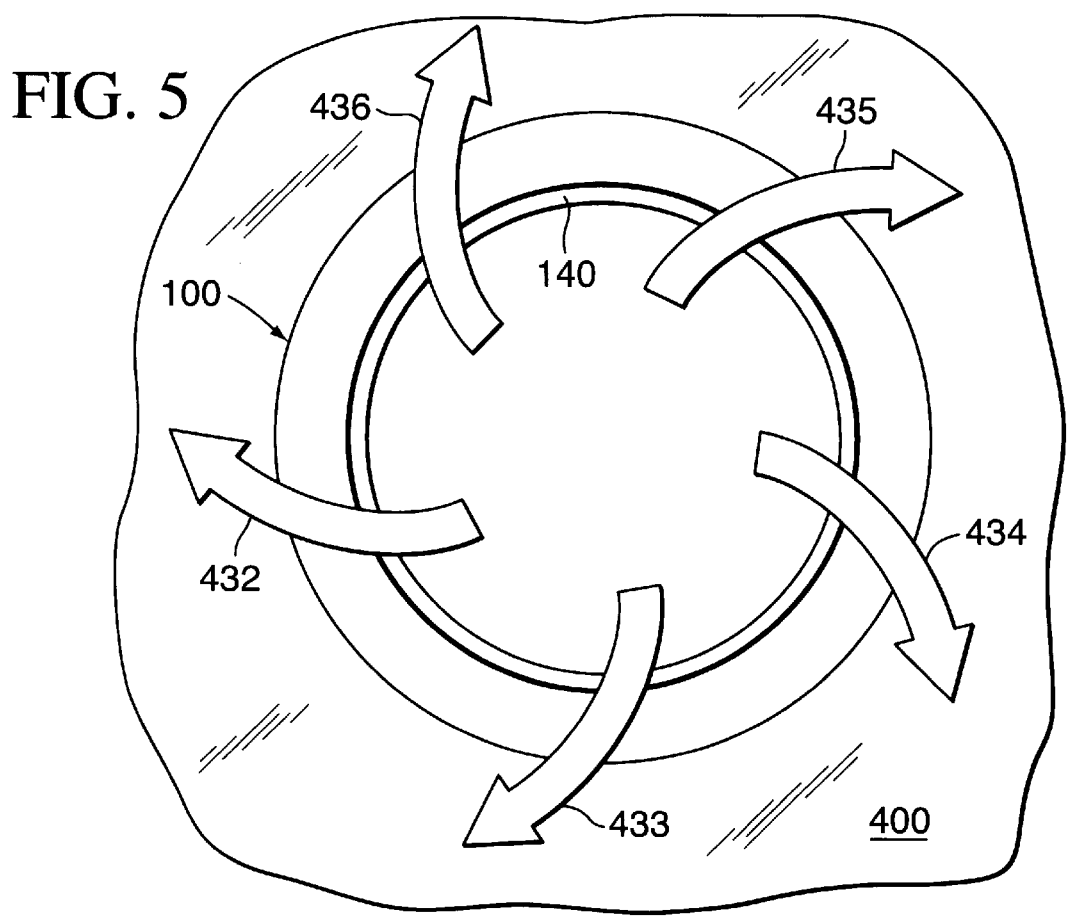
FIG. 5 is a top view of the valve seat insert of FIG. 1 in an operating engine.
Figure 6:
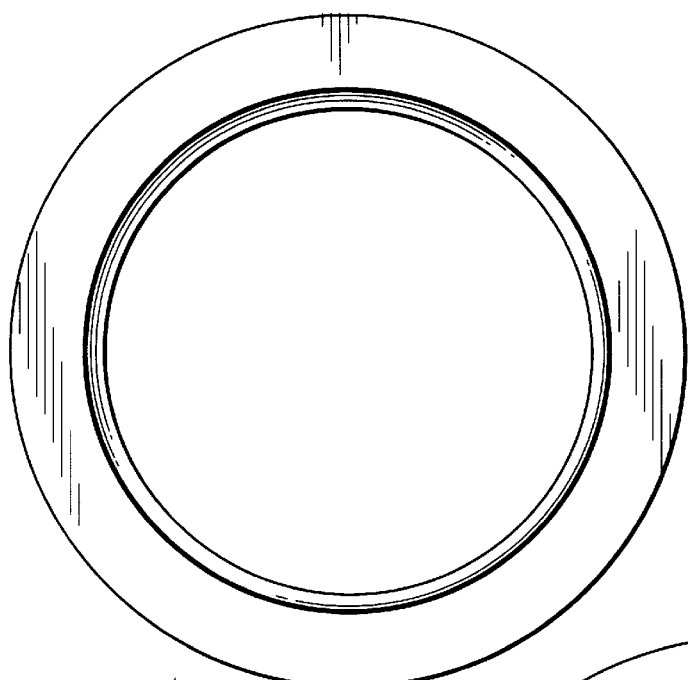
FIGS. 6, 7, and 8 are top, bottom, and side views, respectively, of the valve seat insert of FIG. 1.
Figure 7:
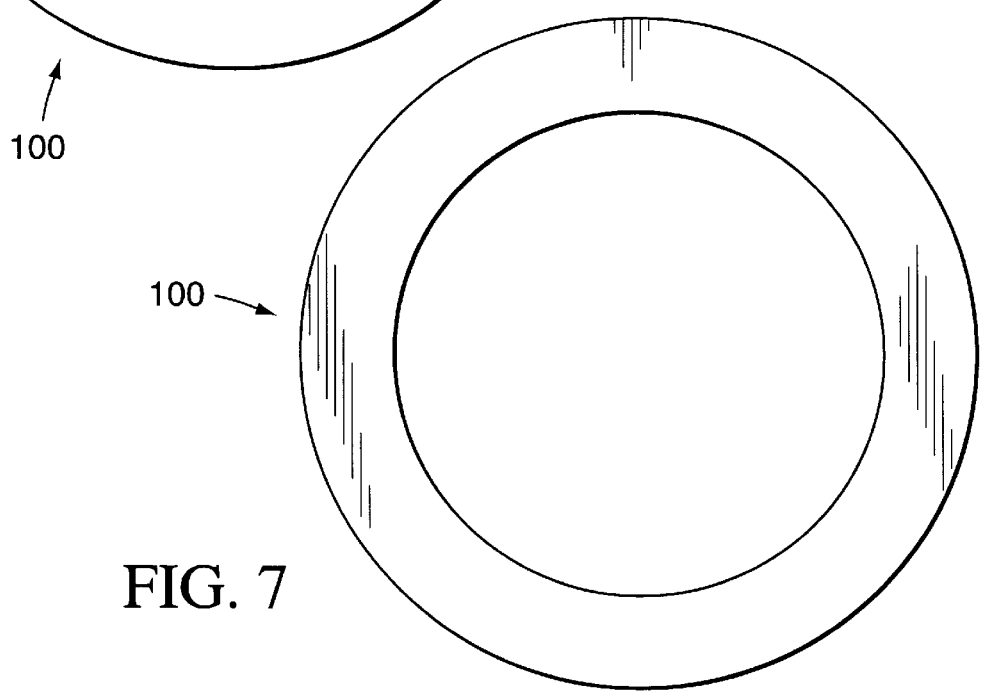
Figure 8:
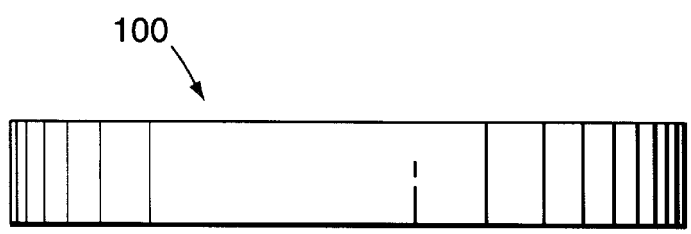

The operation of a valve seat insert in an operating engine, according to various aspects of the invention, may be better understood with reference to FIGS. 4 and 5. Valve seat insert 100 rests in a wall 400 of a combustion chamber of the engine. In one possible engine configuration, wall 400 is a portion of a cylinder head. Valve seat insert 100 cooperates with a valve 420 to regulate the flow of an air-fuel mixture into the combustion chamber, immediately above wall 400 in the cross-sectional view of FIG. 4.

In operation of the engine, valve 420 reciprocates between an open position (illustrated in FIG. 4) and a closed position (not shown). When in the closed position, valve 420 rests on angled seating portion 140 of valve seat insert 100. Angled seating portion 140 is preferably angled to provide substantially continuous contact with valve 420 in its closed position. When in the open position, valve 420 separates from insert 100 to permit an air-fuel mixture to flow past insert 100 and into the combustion chamber.

In FIG. 4, groove 166 appears as a cutout on one side of insert 100. Another groove 410, which is obscured in the view of FIG. 1, appears as a cutout in the opposite side of insert 100.

An air-fuel mixture (represented by vectors 432, 433, and 434 in FIG. 4) moves past insert 100, including grooves 166 and 410. Because of their diagonal orientation, the grooves interact with the flow of the air-fuel mixture to impart a vortex to it. Advantageously, the grooves interact with the air-fuel mixture in the region of its greatest velocity, just before it is slowed by valve 420.

In the top view of FIG. 5, vectors 432–436 illustrate the swirling of the air-fuel mixture as it disperses into the combustion chamber. Valve seat insert 100 imparts a left-hand vortex or swirl to the air-fuel mixture as it moves past insert 100 and enters the combustion chamber. In a fluid flow having a left-hand vortex, the fluid swirls in the direction of a person's curled left-hand fingers when the thumb is aimed parallel to the main direction of flow.

Figure 9:
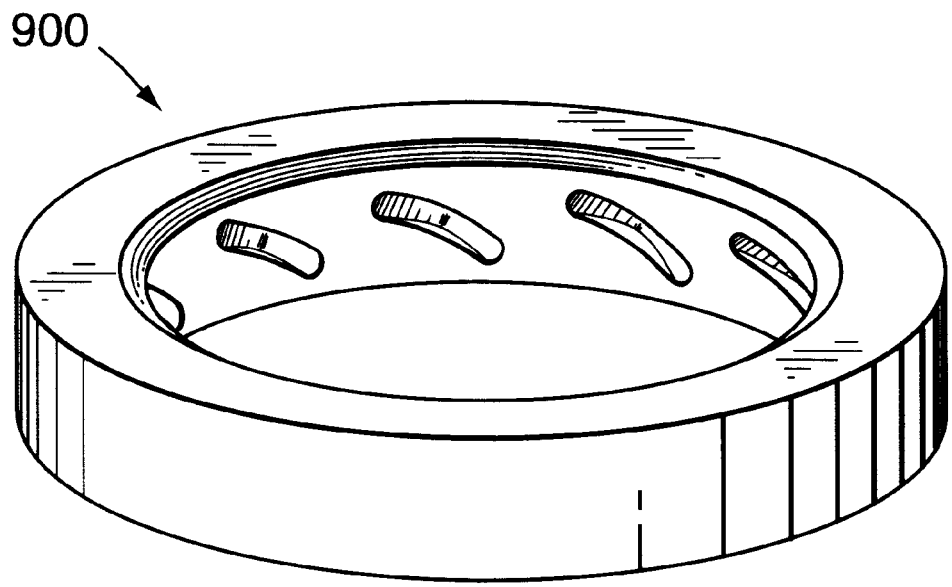
FIG. 9 is a perspective view of a valve seat insert according to various aspects of the present invention having grooves with an opposite orientation from the grooves of FIG. 1.
Figure 10:
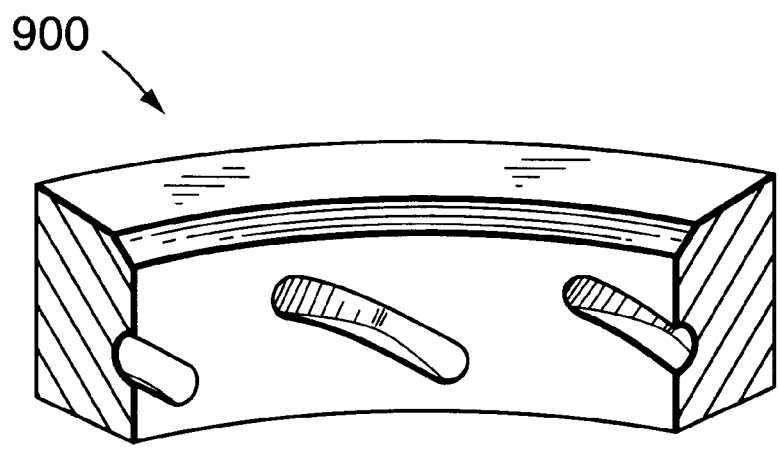
FIG. 10 is a perspective view of a portion of the valve seat insert of FIG. 9.

The orientation of the grooves determines the direction of swirl. In a variation where a right-hand vortex is desired, the grooves will have an opposite orientation from grooves 162–170 of valve seat insert 100. (See valve seat insert 900 of FIGS. 9, 10. In a further variation where multiple vortices are desired and the benefit of a uniform swirl is not needed, the valve seat insert can include two or more groups of grooves having opposite or alternating orientations.

The vortex imparted to the air-fuel mixture is represented by curvature of vectors 432, 434, and 436. This curvature is not drawn to scale in FIGS. 4 and 5 and does not imply any specific amount of vortex that can be expected in actual performance of a valve seat according to various aspects of the present invention. The amount of vortex imparted depends on a number of factors such as the dimension, shape, and orientation of grooves in the valve seat's inner wall, the velocity and composition of the air-fuel mixture, etc. Even a small amount of vortex can produce a measurable improvement in engine performance.

A conventional engine can be modified, according to various aspects of the invention, by replacing conventional valve seat structures with grooved valve seat inserts of the invention. Alternatively, an engine can be manufactured with grooved valve seat inserts. Grooved valve seat inserts can be marketed individually or in kits containing multiple inserts (e.g., one for each intake valve in the engine being modified).

A valve seat insert according to various aspects of the present invention can be fabricated from any suitable materials and by any suitable technique. For example, the valve seat insert can be machined from a suitable heat-tolerant metal alloy. Alternatively, the insert can be cast or otherwise fabricated from suitable nonmetallic materials such as ceramics.

A valve seat insert can more easily dissipate heat into engine structure surrounding it when it is fabricated from material that conducts heat well. For this reason, the insert is preferably fabricated from a metal alloy having high thermal conductivity. However, any alloy may be used that can tolerate the high temperatures encountered by the valve seat insert. Approximate compositions of three exemplary alloys are provided in TABLE I below.

TABLE I

| Element | Alloy #1 | Alloy #2 | Alloy #3 |
| --- | --- | --- | --- |
| Nickel | 42% | 2% | None |
| Chrome | 10–12% | 20% | 20% |
| Molybdenum | 7% | None | 2.3% |
| Vanadium | 1% | None | 1% |
| Carbon | 2.3% | 1.5% | 1.5% |
| Tungsten | None | None | 5% |
| Iron (Fe) | Balance | Balance | Balance |

A valve seat insert according to various aspects of the present invention can also be fabricated by modifying a conventional valve seat insert to add grooves. Alternatively, an inventive insert including grooves can be machined directly from metallic stock.

An exemplary process for modifying a conventional valve seat insert to produce an insert in accordance with the invention includes: (1) providing a solid carbide Keo cutter in an arbor, which is fixed to the table of a vertical milling machine; (2) placing the insert in the arbor; (3) machining grooves in the inner wall of the insert with the arbor; and (4) indexing the arbor to the next desired groove position after machining each groove. In the exemplary process, the valve seat insert is oriented diagonally in the arbor such that the central axis of the insert (e.g., central axis 180 of insert 100) is diagonal to the direction of travel of the cutter. The angle between the central axis and direction of travel of the cutter determines the angle of orientation of grooves in the modified valve seat insert.

While the present invention has been described in terms of preferred embodiments and generally associated methods, the inventor contemplates that alterations and permutations of the preferred embodiments and method will become apparent to those skilled in the art upon a reading of the specification and a study of the drawings. For example, the grooves of the valve seat insert can be curved rather than straight, and the grooves can have a uniform depth rather than being tapered. In addition, valve seat inserts having conventional structure, i.e., lacking grooves, can be advantageously fabricated from the particular alloys disclosed above. For example, the alloy including tungsten permits fabrication of a valve seat insert of conventional structure at reduced cost.

Accordingly, the above description of preferred exemplary embodiments does not define or constrain the present invention. Rather, the issued claims variously define the present invention. Each variation of the present invention is limited only by the recited limitations of its respective claim, and equivalents thereof, without limitation by other terms not present in the claim. Further, aspects of the present invention are particularly pointed out below using terminology that the inventor regards as having its broadest reasonable interpretation; the more specific interpretations of 35 U.S.C. § 112(6) are only intended in those instances where the term "means" is actually recited.

What is claimed is:

1. A valve seat insert comprising a ring bounded by surfaces including an inner wall circumferentially disposed about an central axis, wherein:
   (a) the inner wall includes a plurality of grooves; and
   (b) each groove is oriented diagonally with respect to the central axis.

2. The insert of claim 1 wherein the grooves are oriented substantially parallel to each other.

3. The insert of claim 1 wherein the ring is comprised of an alloy including chrome, carbon, and iron.

4. The insert of claim 3 wherein the ring is comprised of an alloy including nickel, chrome, molybdenum, vanadium, carbon, and iron.

5. The insert of claim 4 wherein the ring comprises about 42 percent nickel, about 10–12 percent chrome, about 7 percent molybdenum, about one percent vanadium, and about 2.3 percent carbon.

6. The insert of claim 3 wherein the ring is comprised of an alloy including nickel, chrome, carbon, and iron.

7. The insert of claim 6 wherein the ring comprises about 2 percent nickel, about 20 percent chrome, and about 1.5 percent carbon.

8. The insert of claim 3 wherein the ring is comprised of an alloy including tungsten, chrome, molybdenum, vanadium, carbon, and iron.

9. The insert of claim 8 wherein the ring comprises about 5 percent tungsten, about 20 percent chrome, about 2.3 percent molybdenum, about one percent vanadium, and about 1.5 percent carbon.

10. The insert of claim 1 wherein each groove has a variable depth, the depth being greatest at the midpoint of the groove.

11. The insert of claim 10 wherein each groove tapers to the inside wall.

12. The insert of claim 10 wherein:
   (a) the ring is further bounded by an outer wall; and
   (b) the depth at the midpoint of each groove is about one-third of the distance between the inner wall and the outer wall.

13. The insert of claim 1 wherein the grooves are spaced substantially equidistant from each other and arranged around the entire ring.

14. The insert of claim 13 wherein each groove is oriented at an angle of about 70–80 degrees from a plane parallel to the central axis.

15. The insert of claim 1 wherein the ring is circular.

16. The insert of claim 15 wherein each groove has a length of about ¼ of the diameter of the ring.

17. The insert of claim 1 wherein each groove has a length of about ½ inch.

18. An internal-combustion engine comprising:
   (a) a valve; and
   (b) a valve seat insert comprised of heat-resistant material and having an inner wall circumferentially disposed about an central axis, wherein:
      (1) the inner wall includes a plurality of grooves;
      (2) the grooves are oriented substantially parallel to each other; and
      (3) each groove is oriented diagonally with respect to a plane parallel to the central axis.

19. The engine of claim 18 further comprising a plurality of valves and a plurality of valve seat inserts, each insert being comprised of heat-resistant material and having an inner wall circumferentially disposed about an central axis, and wherein for each insert:
   (a) the inner wall includes a plurality of grooves;
   (b) the grooves are oriented substantially parallel to each other; and
   (c) each groove is oriented diagonally with respect to a plane parallel to the central axis.

20. The insert of claim 19 wherein each groove has a variable depth, the depth being greatest at the midpoint of the groove.

21. The insert of claim 19 wherein each insert is comprised of an alloy including chrome, carbon, and iron.

22. A valve seat insert comprising:
   (a) a ring of heat-tolerant material having an inner wall; and
   (b) means for imparting a vortex to a flow of air-fuel mixture through the ring while keeping the inner wall of the ring free of protrusions.

* * * * *